Patented Nov. 11, 1941

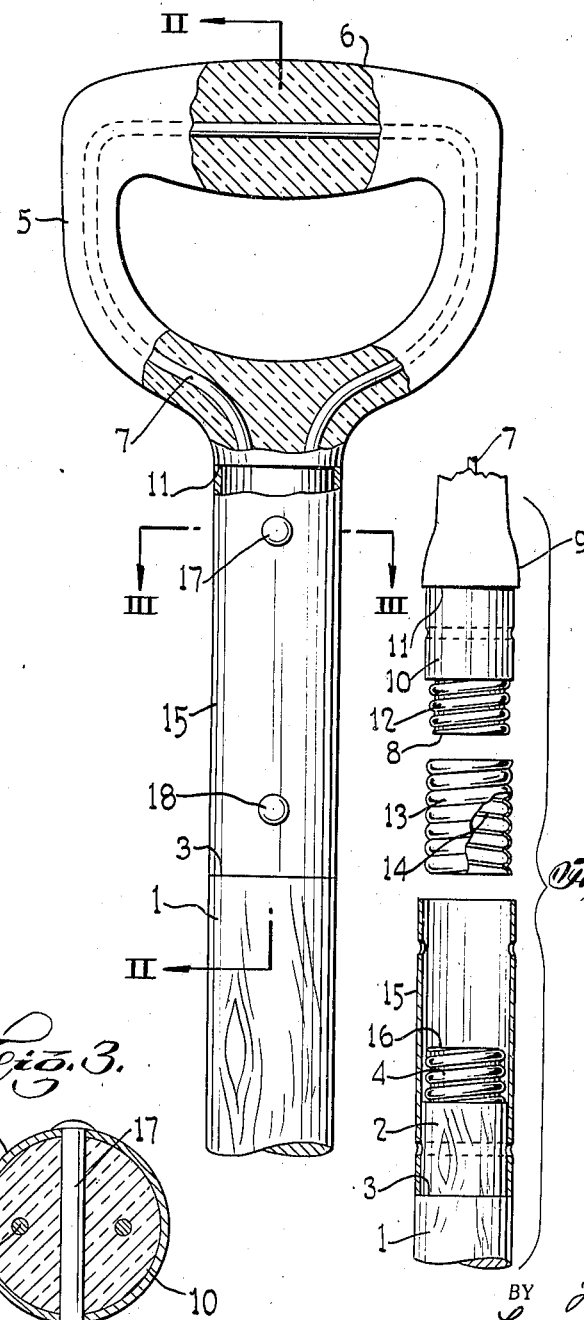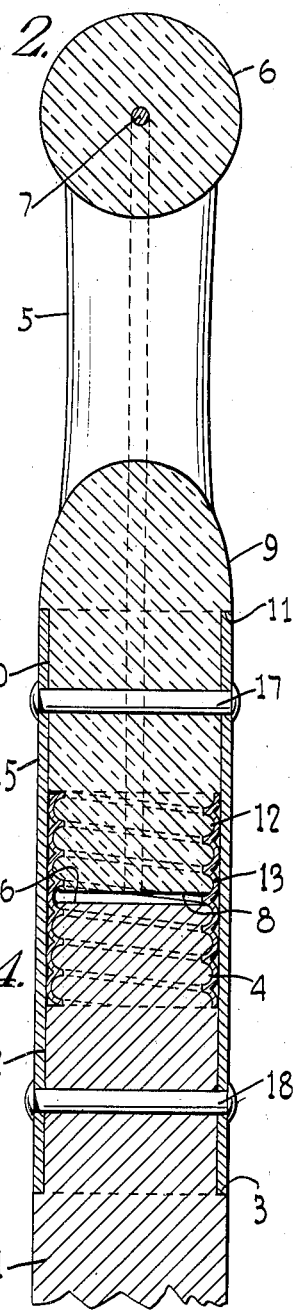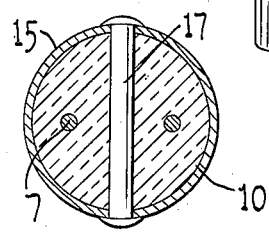

2,262,648

UNITED STATES PATENT OFFICE 2,262,648

HANDLE FOR TOOLS

Eugene E. Peterson and Joseph D. Harrison, Brooklyn, N. Y.

Application November 30, 1940, Serial No. 367,938

6 Claims. (Cl. 294—57)

This invention relates to handles, particularly handles for tools, and especially handles for such tools as shovels, spades, scoops and forks.

The principal object of this invention is to provide a device of the type specified which will afford an easy and agreeable hand grip which will be comfortable to the user thereof.

A further object of the invention is to produce a device of the type specified which will be strong, durable and inexpensive.

A further object of the invention is the production of a device of the type specified which will preferably have a portion thereof made of material which is a non-conductor of electricity.

A further object of the invention is the production of a device of the type specified which will be so constructed of a plurality of parts that each of the several parts when broken or worn out may be readily replaced by like parts.

Other objects and advantages will appear as the description of the particular physical embodiment selected to illustrate the invention progresses, and the novel features will be particularly pointed out in the appended claims.

In describing the invention in detail and the particular physical embodiment selected to illustrate the invention, reference will be had to the accompanying drawing and the several views thereon, in which like characters of reference designate like parts throughout the several views, and in which:

Figure 1 is a front view of a device embodying the invention; Fig. 2 is a cross-sectional view on the plane indicated by the line II—II, viewed in the direction of the arrows at the ends of the line; Fig. 3 is a cross-sectional view upon the plane indicated by the line III—III of Fig. 1, viewed in the direction of the arrows at the ends of the line; Fig. 4 is an exploded view of the several parts going to make up the complete whole comprising the invention.

In the figures, 1 designates a stem. This stem may be made of any suitable or appropriate material and may be considered as made of wood, and as the stem of an ordinary shovel, fork, scoop or spade.

The stem 1, as shown in Fig. 2 and in Fig. 4, is formed with a reduced portion 2 forming a shoulder at 3 and with a further reduced portion formed with an external screw thread 4.

The hand grip portion proper of the tool handle is designated 5. This hand grip portion may be made of any suitable or appropriate form or shape but is preferred to be approximately the contour as shown in Fig. 1 affording a portion 6 which provides a good grip for the hand, a grip which is easy, agreeable and comfortable.

The D handle 5 is preferably made of any of the usual and appropriate plastics, Bakelite is especially suitable. The preferred plastics are those which are moulded by heat and pressure.

The handle 5 is preferably reinforced in any suitable or appropriate manner and preferably by means of a metal member 7 extending from the end 8 of the handle member up and around the grip portion 6. This reinforcement 7 is preferably of metal and preferably of the deformed type although fibre reinforcement such as asbestos fibres would be suitable. By this statement it is not intended to exclude a plurality of metal members, or a woven material or a crudely formed mass of fibres.

The handle member 5 is provided with a tang 9 and this tang is formed with a reduced portion 10 affording a shoulder 11 and with a further reduced portion formed with an external screw thread 12.

In addition to the parts mentioned there is also furnished the union 13. This union 13 has an internal thread 14 and is preferably made of metal, iron, steel, brass or bronze would be suitable. The thread 14 of the union 13 may be formed in any suitable or appropriate manner but it is preferred to form a rolled thread.

In addition to the parts already described there is further provided a ferrule 15. This ferrule 15 should be made of metal, and steel or iron would be preferable. This ferrule 15 has an internal diameter such that it just receives the reduced portion 2 of the stem 1 and the reduced portion 10 of the tang 9 of an external diameter such that it is just flush with the outside of the tang 9 and the outside of the stem 1.

In assembling the parts, the ferrule 15 may be placed on either the tang 9 or the stem 1. In Fig. 4 it is shown as placed upon the stem 1. Then the union 13 is screwed upon the screw 12 of the tang 9 and then it is entered within the ferrule and screwed on to the screw threads 4, but the end 8 of the tang and the end 16 of the stem do not come together because the parts are so made that the ferrule 15 abuts shoulder 3 and shoulder 11 before this occurs. When the shoulder 11 of the tang 9 and the shoulder 3 of the stem 1 firmly abut the opposite ends of the ferrule 15 holes are drilled through both the tang and the stem and rivets as 17 and 18 are inserted and headed, holding all parts in proper position and firmly together making a very strong and durable construction which it is evident is quite inexpensive to make.

From the above description it will be seen that the tool handle is of a form such that if any parts become broken they may readily be replaced by a like part, for instance, if the hand grip portion 6 becomes broken, then the rivets 17 and 18 may be cut and a new hand grip portion 5 used to replace the broken part. In the same way, if the stem 1 becomes broken it may be replaced by a new stem. Of course, if either the ferrule 15 or the union 13 becomes broken those parts also may be replaced by like parts.

Although we have particularly described one particular physical embodiment of our invention and explained the operation, construction and principle thereof, nevertheless, we desire to have it understood that the form selected is merely illustrative but does not exhaust the possible physical embodiments of the idea of means underlying our invention.

What we claim as new and desire to secure by Letters Patent of the United States is:

1. A tool handle including, in combination: a stem for attachment to a tool, said stem formed with a reduced portion forming a shoulder and a second reduced portion formed with a screw thread, a D handle formed of plastic material and formed with a tang, said tang formed with a reduced portion forming a shoulder and a further reduced portion formed with a screw thread, a union formed with an internal screw thread screwed onto the tang and onto the stem and uniting them, a ferrule surrounding the union the tang and the stem and abutting the shoulder of the tang and the shoulder of the stem, and rivets, one passing through the tang and the ferrule and another passing through the stem and the ferrule.

2. A tool handle including, in combination: a D handle formed of plastic material and formed with a tang, a stem formed with a screw thread, means for securing the tang to the stem and means completely concealing the last named means.

3. A tool handle including, in combination: a stem for attachment to a tool, a D handle formed of plastic material, means including a screw threaded union for uniting the D handle to the stem and means for completely concealing the screw threaded union.

4. A tool handle, including in combination: a stem for attachment to a tool, said stem formed with a reduced portion forming a shoulder, a D handle formed of plastic material and formed with a tang, said tang formed with a reduced portion, a ferrule, said ferrule adapted to surround both the reduced portion of the tang and the reduced portion of the stem and to abut the shoulders thereof, and means for drawing the stem and the tang toward one another against the shoulders completely concealed by the ferrule.

5. A tool handle, including in combination: a stem for attachment to a tool, said stem formed with a reduced portion forming a shoulder, a D handle formed of a plastic material and formed with a tang, said tang formed with a reduced portion, a ferrule, said ferrule adapted to surround both the reduced portion of the tang and the reduced portion of the stem and to abut the shoulders thereof, and means for drawing the stem and the tang toward one another against the shoulders completely concealed by the ferrule, and headed rivets, one passing through the ferrule and the tang and another passing through the ferrule and the stem.

6. A tool handle, including, in combination: a D handle formed of plastic material and formed with a shoulder and a tang, a stem formed with a shoulder and a reduced portion, a ferrule surrounding the tang and the reduced portion and abutting the shoulders, means entirely concealed by the ferrule for uniting the tang and the stem, and means attaching the ferrule to the tang and the reduced portion.

EUGENE E. PETERSON.
JOSEPH D. HARRISON.